(12) United States Patent
Benham

(10) Patent No.: US 11,248,356 B2
(45) Date of Patent: Feb. 15, 2022

(54) REMOVABLE REEF AND BARRICADE SYSTEM, APPURTENANCES, AND MEANS OF MANUFACTURE

(71) Applicant: Roger A. Benham, San Diego, CA (US)

(72) Inventor: Roger A. Benham, San Diego, CA (US)

(*) Notice: Subject to any disclaimer, the term of this patent is extended or adjusted under 35 U.S.C. 154(b) by 0 days.

(21) Appl. No.: 16/813,110

(22) Filed: Mar. 9, 2020

(65) Prior Publication Data

US 2020/0208365 A1 Jul. 2, 2020

Related U.S. Application Data

(63) Continuation-in-part of application No. PCT/US2018/067788, filed on Dec. 28, 2018.

(60) Provisional application No. 62/612,112, filed on Dec. 29, 2017, provisional application No. 62/815,422, filed on Mar. 8, 2019, provisional application No. 62/828,548, filed on Apr. 3, 2019.

(51) Int. Cl.
| | |
|---|---|
| *E02B 3/06* | (2006.01) |
| *E02B 3/04* | (2006.01) |
| *F03B 13/22* | (2006.01) |
| *H02K 7/18* | (2006.01) |
| *B21B 1/22* | (2006.01) |
| *H02K 7/08* | (2006.01) |
| *A01K 61/75* | (2017.01) |
| *A01K 61/70* | (2017.01) |

(52) U.S. Cl.
CPC .............. *E02B 3/06* (2013.01); *B21B 1/22* (2013.01); *E02B 3/046* (2013.01); *E02B 3/062* (2013.01); *F03B 13/22* (2013.01); *H02K 7/08* (2013.01); *H02K 7/1823* (2013.01); *A01K 61/70* (2017.01); *A01K 61/75* (2017.01)

(58) Field of Classification Search
CPC ........ A01K 61/70; A01K 61/75; E02B 3/046; E02B 3/06; E02B 3/062; B21B 1/22; F03B 13/22; H02K 7/08; H02K 7/1823
See application file for complete search history.

(56) References Cited

U.S. PATENT DOCUMENTS

| | | | |
|---|---|---|---|
| 3,928,701 A | 12/1975 | Roehner | |
| 4,186,913 A * | 2/1980 | Bruner | E01F 15/088 256/13.1 |
| 4,196,694 A * | 4/1980 | Buchanan | A01K 61/70 119/222 |
| 4,388,019 A * | 6/1983 | Kajihara | A01K 61/70 405/25 |
| 4,439,059 A | 3/1984 | Kikuzawa et al. | |
| 4,465,399 A * | 8/1984 | Kikuzawa | E02B 3/046 405/32 |

(Continued)

FOREIGN PATENT DOCUMENTS

EP 0747534 A1 12/1996

*Primary Examiner* — Carib A Oquendo
(74) *Attorney, Agent, or Firm* — Welsh Flaxman & Gitler LLC

(57) ABSTRACT

The present invention relates to a removable artificial reef and barrier system capable of mitigating detrimental wave and current energy and erosion problems, enhancing biological growth and marine aquaculture, increasing carbon sequestration, providing power generation, and enhancing favorable surf conditions for recreational use.

10 Claims, 14 Drawing Sheets

(56) References Cited

U.S. PATENT DOCUMENTS

| | | | | |
|---|---|---|---|---|
| 4,947,791 | A | 8/1990 | Laier et al. | |
| 4,954,013 | A * | 9/1990 | Lamberton | E02B 3/06 405/25 |
| 5,238,325 | A * | 8/1993 | Krenzler | A01K 61/70 405/21 |
| 9,422,684 | B2 * | 8/2016 | Danenhower | E02B 3/062 |
| 2013/0170909 | A1 * | 7/2013 | Osby | E02B 3/062 405/26 |
| 2014/0042749 | A1 | 2/2014 | Siegel | |
| 2015/0330046 | A1 * | 11/2015 | Betcher | E02B 3/062 405/26 |

* cited by examiner

REMOVABLE REEF AND BARRICADE SYSTEM, APPURTENANCES, AND MEANS OF MANUFACTURE

BACKGROUND OF THE INVENTION

1. Field of the Invention

The present invention relates to a removable artificial reef and barricade structure, and appurtenances. In particular, the invention relates to an artificial reef and barricade structure capable of mitigating detrimental wave and current energy and erosion problems, enhancing biological growth, improving marine aquaculture, increasing carbon sequestration, providing power generation, enhancing favorable surf conditions for recreational use, and serving as a barricade structure for both land and marine applications.

2. Discussion of Related Art

In many cases, continuous wave motion, water currents, and circulation patterns cause undesirable erosion and sand migration problems on beaches and coastal environments. There are many examples of erosion and wave energy dissipation designs employed to mitigate these damaging conditions. In some cases erosion or wave energy dissipation designs include barriers made of rock, or riprap, jetty type installations that can forcibly stop wave and current impact energy. In other designs erosion or wave energy is dissipated by means of a man-made installation that mimics a natural reef. These "artificial reefs" have been made of concrete, steel, used tires, waste construction materials, inflatable bladders, rock, or multitudes of other materials.

Besides the potentially high cost, one of the serious consequences of erosion and wave energy dissipation designs is the permanent nature of the installations, making them less acceptable due to both expert and public concerns and opinions. Because of the synergistic effects of a multitude of factors, in some cases it is very difficult to predict the long term results of an installation. In some cases there have been undesirable or unintended effects, such as an increase in erosion and sand migration, or, a negative impact on an environmentally sensitive area or a loss of a recreational asset associated with the coastal area. The same concerns often apply to the installation of a barricade structures, such as a fence or a wall, where the permanent nature of the installation has similar unintended affects, in addition to human social affects.

In some applications an erosion or wave energy dissipation design can be intentionally built to enhance the recreational use of a coastal area. This can be the case where the design causes a larger and more user friendly beach area to form, that is made safer with a calm bay-like ingress and egress and less danger from waves breaking on the shore, or, in the ultimate sense of a recreational surfer, the transformation of a poor beach break into a reef like surfing experience where the waves peak at a more fixed and predictable point and peel left and right.

A particular benefit of erosion and wave energy dissipation designs, which in today's world-wide focus upon environmental restoration and carbon sequestration, is the inherent opportunity for marine life enhancement that can accompany an artificial reef installation.

In many cases there is a desire to create a barrier to restrict access to specific areas, both on land and on waters. With many examples of natural formations that restrict access, it is no coincidence that an artificial reef design would provide this benefit.

There are many efforts being taken to develop zero emission power generation, including machines to harness wave, tidal, and wind power. It is no coincidence that the effort to dissipate wave, tidal, and current energy for erosion control would lead to the opportunity to harness that energy to produce usable power.

There are various designs and methods for erosion or wave energy dissipation, artificial reef construction, barrier construction, and power generation. These designs all have their benefits and shortcomings. The present invention is designed to provide additional options for erosion control, wave energy dissipation, artificial reef and barricade construction, marine life and ecosystem restoration, power generation, and carbon sequestration, when compared to other presently available alternatives. In addition, the present invention is particularly important for the improvement in quality of life, benefits to the environment, and cost benefits to the consumer.

SUMMARY OF THE INVENTION

The present invention is directed to an improved artificial reef and barrier device which may at least partially overcome the disadvantages of existing systems, improve the environment, or provide the consumer with a useful or commercial choice.

In a broad form, the invention resides in a continuous assemblage of elongated members semi-uniformly spaced, such as a coil shaped structure, that form a continuous structure to impede or harness wave, tidal, and water wave and current energy, and object movement including people of moving vehicles both in waters and on land. The structure can be an assemblage or continually formed, reinforced, and secured in a manner to reside either on the floor of the a marine environment, suspended, or floated at any desirable depth from the surface, where the geometry of the coil is designed to cause destructive interference to the rotational or direct wave and current energy (later referred to as Dynamic Destructive Interference, or DDI), thereby mitigating erosion or detrimental effects of the wave and current energy, or, configured to harness energy by producing a rotational force. The directional and site placement aspects of the implementation of this invention are such that the installed system provides enhanced marine and biological growth, marine aquaculture, and enhanced action-sport recreational use of coastal areas, or the optimal energy output. The fabrication method, cost benefits, and removability of this invention allows for either temporary, trial basis, or low cost removal of the system.

According to a first aspect there may be provided a removable artificial reef and barrier system including a wave and current energy dissipater and barrier system in the form of a coil. The wave and current energy dissipater and barrier system has a plurality of spaced dissipater barrier legs that are spaced at a distance to achieve wave and current energy dissipation and prevent or mitigate movement of objects such as people or vehicles on land or in waters. The wave and current energy dissipater and barrier system is composed of strands of material spaced about a central axis so as to define the plurality of dissipater barrier legs.

In some embodiments the wave and current energy dissipater and barrier system is constructed in the form of a coil.

In some embodiments the dissipater barrier legs are spaced from 10 centimeters to 3 meters from each other.

In some embodiments the dissipater barrier legs are spaced 1.5 meters from each other and the wave and current energy dissipater and barrier system has a diameter of 4 meters.

In some embodiments the wave and current energy dissipater and barrier system is supported by a pontoon assembly.

In some embodiments the removable artificial reef and barrier system includes structural elements integrated in the wave and current energy dissipater and barrier system.

In some embodiments the structural elements include rivets joining the dissipater barrier legs.

In some embodiments the structural elements include welds joining the dissipater barrier leg to a lateral structural stringer via additive manufacturing.

In some embodiments the structural elements include a plug-weld joining the dissipater barrier leg to a lateral structural stringer.

In some embodiments the wave and current energy dissipater and barrier system has a hydrofoil profile.

In some embodiments the removable artificial reef and barrier system includes a plurality of wave and current energy dissipater and barrier systems.

In some embodiments the plurality of wave and current energy dissipater and barrier systems are concentrically oriented.

In some embodiments the plurality of wave and current energy dissipater and barrier systems are supported by a pontoon assembly.

In some embodiments the plurality of wave and current energy dissipater and barrier systems are of different sizes.

In a further aspect there may be provided a method for wave and current energy dissipation and barricade including continuously forming at least one wave and current energy dissipater and barrier system. The method also includes positioning the at least one wave and current energy dissipater and barrier system within a marine environment at a position to achieve wave and current energy dissipation and provide a barrier to prevent or mitigation the movement of objects including people or vehicles. The wave and current energy dissipater and barrier system includes a plurality of spaced dissipater barrier legs that are spaced at a distance to achieve wave and current energy dissipation, wherein the wave and current energy dissipater and barrier system is composed of strands of material spaced about a central axis so as to define the plurality of dissipater barrier legs.

In some embodiments the method for wave and current energy dissipation includes the step of positioning a plurality of wave and current energy dissipater and barrier systems within a water body at a position requiring wave and current energy dissipation.

In some embodiments the step of positioning includes positioning the wave and current energy dissipater and barrier systems within the water body for erosion control, to create an artificial reef and barricade for eco-system growth and enhancement, or to create enhanced and more desirable recreational effect.

In some embodiments the step of positioning includes resting the wave and current energy dissipater and barrier system on the floor of the marine environment.

In some embodiments the step of positioning includes supporting the wave and current energy dissipater and barrier system such that it sits near the upper water surface of the marine environment.

In another aspect there may be provided a rolling machine used in the fabrication of a wave and current energy dissipater and barrier system. The rolling machine includes a rotating roller support upon which is mounted at least one roll forming assembly that rotates with the rotating roller support. The rolling machine also includes a rotating shaft upon which the rotating roll forming assembly is mounted and a drive motor acting upon the rotating shaft in a manner causing rotation of the rotating shaft. The rolling machine acts upon a metallic strip material to form the wave and current energy dissipater and barrier system.

In some embodiments the at least one roll forming assembly includes an upper roller and a lower roller which shape the metallic strip material into a roll form shape.

In some embodiments the upper roller has an external concave profile and the lower roller has an external convex profile.

In some embodiments the at least one roll forming assembly includes a first roll forming assembly and a second roll forming assembly.

In some embodiments the rolling machine includes a pedestal mount upon which is mounted the rotating shaft.

Additional advantages of the embodiments will be set forth in part in the description which follows, and in part will be understood from the description, or may be learned by practice of the invention. The advantages will be realized and attained by means of the elements and combinations particularly pointed out in the appended claims.

DETAILED DESCRIPTION OF THE PREFERRED EMBODIMENTS

Figure 1:
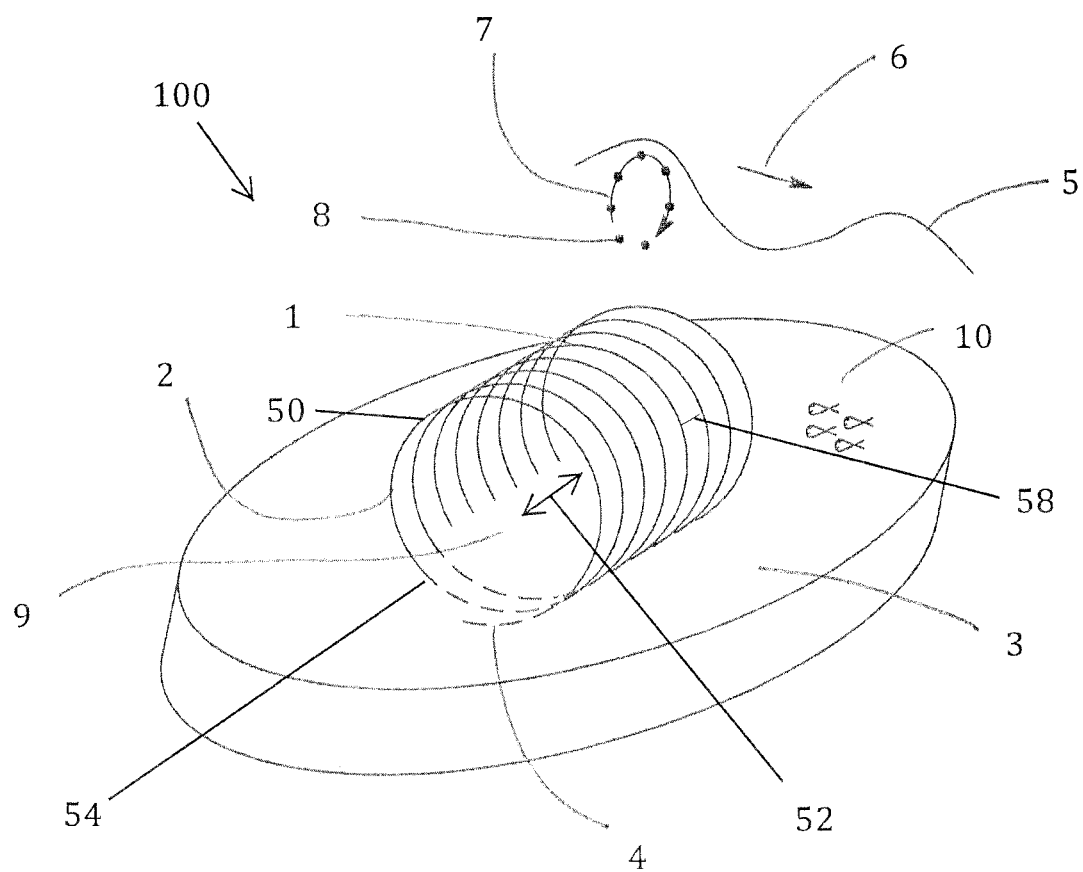
FIG. 1 shows a three-dimensional perspective view of the removable artificial reef and barrier system in one embodiment of a wave and current energy dissipation and barrier mechanism in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 through 14, the removable artificial reef and barrier system 100, 100', 100", 100'", 100"", 100""' and its preferred features and functions are illustrated. As will be appreciated based upon the following disclosure, the present removable artificial reef and barrier system 100, 100', 100", 100'", 100"", 100""' is structured to provide for erosion control in a marine environment, creation of an artificial reef and barricade for eco-system growth and enhancement, marine aquaculture, and enhanced and more desirable recreational effect. It should also be appreciated that various embodiments are disclosed herein, and similar reference numerals have been used for similar structural elements.

FIG. 1 shows the preferred layout of an installed removable artificial reef and barrier system 100 in accordance with a preferred embodiment of the invention. As will be appreciated based upon the following disclosure, the removable artificial reef and barrier system 100 for the wave and current energy dissipation is implemented in the following manner. At least one wave and current energy dissipater and barrier system 1 is positioned within a marine environment at a position requiring wave and current energy dissipation. The wave and current energy dissipater and barrier system 1 including a plurality of spaced dissipater barrier legs 2 that are spaced at a distance to achieve wave and current energy dissipation, wherein the wave and current energy dissipater and barrier system 1 is composed of continuous strands of material continuously wrapped about a central axis so as to define the plurality of dissipater barrier legs 2.

The first component in the artificial removable artificial reef and barrier system shown in FIG. 1 is the wave and current energy dissipater and barrier system 1. In the embodiment of the invention shown in FIG. 1, the wave and current energy dissipater and barrier system 1 is in the form of a coil, that is, a length of material wound or arranged in a spiral configuration. It is, however, appreciated the wave and current energy dissipater and barrier system 1 may be constructed in other forms of a mesh or grid-like structure in other shapes, such as circular, cone, square, triangular, or rectangular. In addition, it is appreciated the wave and current energy dissipater and barrier system 1 can be made from either a continuous process or an assemblage of fabricated parts.

The wave and current energy dissipater and barrier system 1 is composed of a series of individual dissipater barrier legs 2 that are spaced at a specified distance apart to achieve wave and current energy dissipation or other objectives. The dissipater barrier legs 2 are defined by the individual circular elements making up the coil construction of the wave and current energy dissipater and barrier system 1.

The wave and current energy dissipater and barrier system 1 is composed of strands of material spaced about a central axis 52 so as to define the plurality of dissipater barrier legs 2. In accordance with a preferred embodiment, the wave and current energy dissipater and barrier system 1 is composed of continuous strands of material 50 continuously wrapped about a central axis 52 with a predefined radius of curvature so as to define the plurality of dissipater barrier legs 2 making up the dissipater and barrier system 1. The wave and current energy dissipater and barrier system 1 is constructed to extend in a longitudinal direction from a first end 54 thereof to a second end 56 thereof. The wave and current energy dissipater and barrier system 1 is also constructed with a predefined pitch between adjacent dissipater barrier legs 2, and the various dissipater barrier legs 2 making up the wave and current energy dissipater and barrier system 1 are, therefore, preferably spaced evenly along the central axis 52 of the wave and current energy dissipater and barrier system 1.

The spacing 58 of the dissipater barrier legs 2 is defined as the distance between adjacent dissipater legs when measure along the central axis 52 of the wave and current energy dissipater and barrier system 1. In accordance with a preferred embodiment, the spacing of the dissipater barrier legs 2 from each other preferably ranges from approximately 10 centimeters to 3 meters depending on the diameter of the coil defining the wave and current energy dissipater and barrier system 1, wherein the diameter of the coil preferably ranges from approximately 26 centimeters to 8 meters. More preferably, the spacing of the dissipater barrier legs 2 from each other is approximately 1.5 meters for a wave and current energy dissipater and barrier system 1 having a coil diameter of 4 meter.

In the embodiment of the invention shown in FIG. 1 the wave and current energy dissipater and barrier system 1 is resting on the seafloor 3, where a portion of the dissipater barrier legs 2 are buried within the seafloor 3 so as to define buried legs 4. It is noted that proper functioning of the dissipater and barrier system 1 does not require buried legs 4 and the wave and current energy dissipater and barrier system 1 could be installed on any type of sea floor of any characteristic, including rock formations or spanning chasms.

In the embodiment of the invention shown in FIG. 1, the wave and current energy dissipater and barrier system 1 is shown completely submerged below the water surface 5 at a particular depth. The water surface 5 has a wave characteristic with a specific wave direction 6. Using the classic model of wave energy motion in water, the wave energy associated with the wave direction 6 is in the form of a circular wave particle motion 7. Part of the classic model of wave energy motion in water is that the energy of a wave is made up of the circular motion of individual wave particles 8.

In the preferred embodiment of the invention shown in FIG. 1, the wave and current energy dissipater and barrier system 1 disrupts wave and current energy by interfering with the circular wave particle motion 7, causing a scattering of the wave and current energy, resulting in a complex condition of destructive interference of wave particles 8. The result of the destructive interference results in the dissipation of wave and current energy not being solely absorbed, or caused, by impact energy on the dissipater barrier legs 2. What energy is impacted upon the dissipater barrier legs 2 is not solely from the direction, or in the direction, of the wave direction 6, due to the wave particle motion 7 occurring forwards and backwards relative to the dissipater barrier legs 2. In other words, and depending upon the specific characteristics of the fluid flow, there is a force and counterforce acting upon each adjacent dissipater barrier leg 2, and upon the whole wave and current energy dissipater and barrier system 1 in general. A net result of the various forces and wave and current energy dissipation is a relative calm occurring within, downstream, and in the vicinity of the central treated zone 9 within the wave and current energy dissipater and barrier system 1, with wave and current energy dissipation characteristics manneristic to that achieved by the use of a Faraday cage and the mechanisms of destructive wave interference used to shield electromagnetic waves. The design, sizing, and placement of the artificial reef and barrier system, including diameter, spacing 58 between dissipater barrier legs 2, cross section (profile) of dissipater barrier legs 2, depth of placement, means of securing and flotation (including active dynamic pivoting, rotating, and floating and sinking), and placement of multiple artificial reef and barrier systems (both in the vertical and horizontal), all contribute to a process of wave and current energy dissipation referred to as Dynamic Destructive Interference, DDI.

Also shown in FIG. 1 is the marine life 10 that would be attracted to live and grow in the artificial reef and barricade environment created by the wave and current energy dissipater and barrier system 1 structure, especially the central treated zone 9. The design and material of construction of the wave and current energy dissipater and barrier system 1, including the dissipater barrier legs 2, could include the use of a bio-compatible and bio-enhancing material to accelerate marine growth. It is further contemplated the material of construction may be seeded with a live organism or embryonic state to enhance and foster growth and the cross-sectional shape (profile) of dissipater barrier legs 2 to provide shielded habitat for biological growth.

Figure 2:
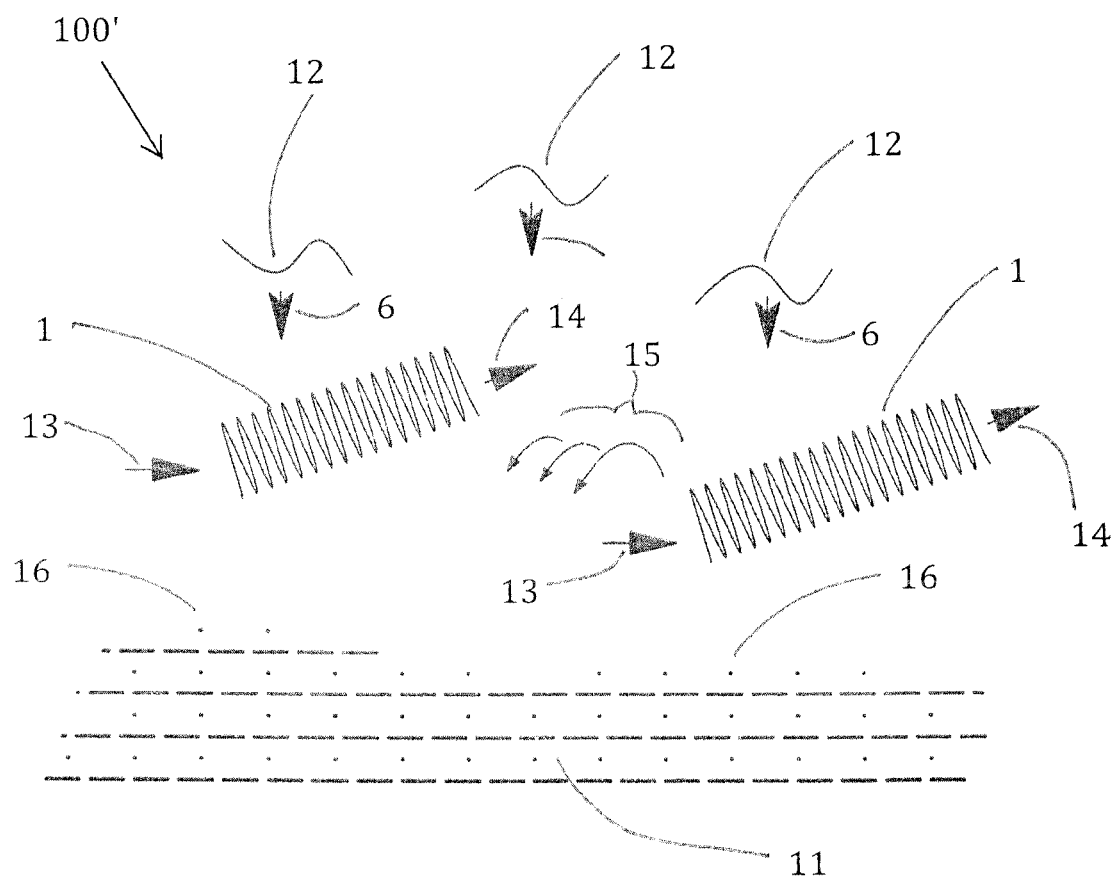
FIG. 2 illustrates a preferred implementation of the present removable artificial reef and barrier system used for manipulating detrimental wave and current erosion along with enhancement of an ordinary beach break into a world class point break configuration.

FIG. 2 shows a preferred implementation of the removable artificial reef and barrier system 100', where two wave and current energy dissipater and barrier systems 1 are installed at a predetermined distance off a beach 11 in a coastal area. As is typical of a beach environment, there is a component of wave energy 12 coming toward the beach 11, typically with a wave direction 6 directly toward the beach 11, as shown in FIG. 2. The wave and current energy dissipater and barrier systems 1 are installed to dissipate the wave energy 12 before it hits the beach, thereby mitigated erosion of the beach, creating and protecting valuable land assets, and other benefits.

As shown in FIG. 2, the two wave and current energy dissipater and barrier systems 1 are installed at an angle relative to the beach 11, in order to accomplish various desired effects. One desired effect is to disrupt the erosive action of a direction of a laterally flowing current 13 to a less erosive more non-lateral flowing current 14. Each particular beach environment will have a specifically preferred orientation of the dissipater and barrier system to accomplish the desired effect regarding laterally flowing current 13 and non-laterally flowing current 14. The exact angular orientation of the wave and current energy dissipater and barrier systems 1 relative to the beach 11 is determined based upon the specifics of the beach, the current flows, and prior installation experience As shown in FIG. 2, there is a space between the two wave and current energy dissipater and barrier systems 1 where the wave energy 12 is not dissipated, creating peak waves 15. Peak waves 15 are a very desirable form of wave for surfing activities and other action-sports related activities. Another aspect of using the wave and current energy dissipater and barrier systems 1 to create peak waves 15 is the directional characteristic of the peak waves 15 to break counter to the direction of the laterally flowing current 13, causing further disruption to the energy of the laterally flowing current 13, with resultant sand deposition at beach nodal zones 16 at the water land (beach) interface areas. As those skilled in the art appreciate, in many cases beach erosion is caused more by the flow of water current that occurs parallel to the beach than by the wave action striking the beach. The flow current parallel to the beach caries the sand many miles down the beach, creating large beaches at locations downstream, and minimal beaches upstream. The cause of the current flow parallel to the beach is usually the global ocean currents (Attic current on the West coast, Gulf current on the East coast). There are also currents caused by rivers, boat traffic, etc. These lateral currents are addressed by the present invention.

Figure 3:
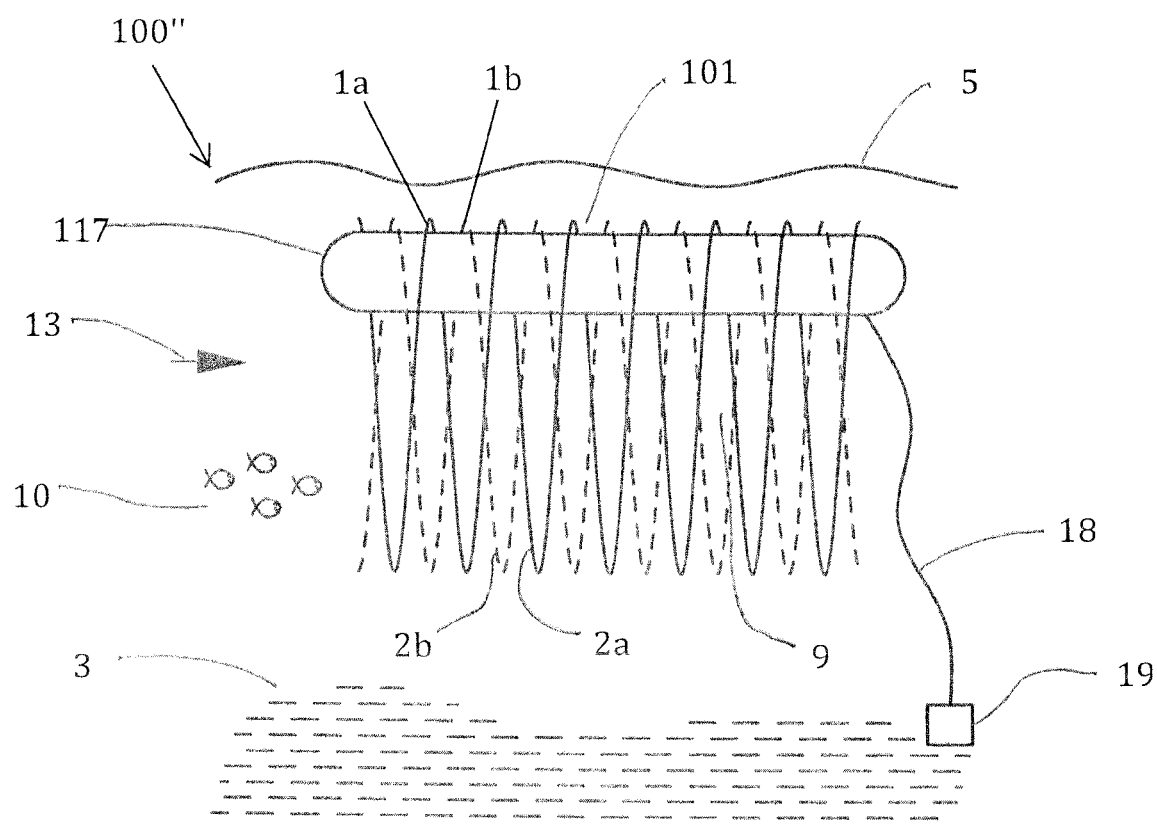
FIG. 3 shows a preferred implementation of the present removable artificial reef and barrier system used for wave and current erosion, as well as marine life and ecosystem enhancement, in a floating configuration.

FIG. 3 shows a preferred embodiment of the removable artificial reef and barrier system 100", where a wave and current energy dissipater and barrier assembly 101 is floated on our near the water surface 5 with a pontoon assembly 17. In accordance with a preferred embodiment, the pontoon assembly 17 is constructed of pipe material, extruded material, sheet metal, etc. The entire assembly of the wave and current energy dissipater and barrier assembly 101 and pontoon assembly 17 is shown anchored to the seafloor 3 with a tether 18 attached to an anchor 19. It is appreciated the pontoon assembly 17 is only one option for suspending the wave and current energy dissipater and barrier assembly 101 at or near the water surface 5, and practical consideration would allow for the use other means of providing buoyant forces, including material selection, and hollow gas filled sections of the wave and current energy dissipater and barrier assembly 101 itself.

In accordance with this preferred embodiment, the wave and current energy dissipater and barrier assembly 101 is composed of a first wave and current energy dissipater and barrier system 1a and a second wave and current energy dissipater and barrier system 1b, which are concentrically positioned. The first wave and current energy dissipater and barrier system 1a and a second wave and current energy dissipater and barrier system 1b are mirror images of each other, and the coil of the first wave and current energy dissipater and barrier system 1a defines a right hand coil while the second wave and current energy dissipater and barrier system 1b defines a left hand coil. As such, there are opposing coils of dissipater legs, that is, a right hand coil of dissipater barrier legs 2a of the first wave and current energy dissipater and barrier system 1a and a left hand coil of dissipater barrier legs 2b of the second wave and current energy dissipater and barrier system 1b.

In the event there is a laterally flowing current 13, the cross section of the dissipater barrier legs 2a, 2b can be shaped in the form of an air foil or baffle to produce either lift or drag in the desired directions, further contributing forces to what was earlier described as counter energy to produce the desired results of directional control of the wave and current energy dissipater and barrier system 1 or dissipation of wave and current energy.

Also shown in FIG. 3 is an illustration of marine life 10 that would be attracted to live and grow in the vicinity of the protection zone created by the dissipater and barrier system 1 structure, especially the central treated zone 9.

Figure 4:
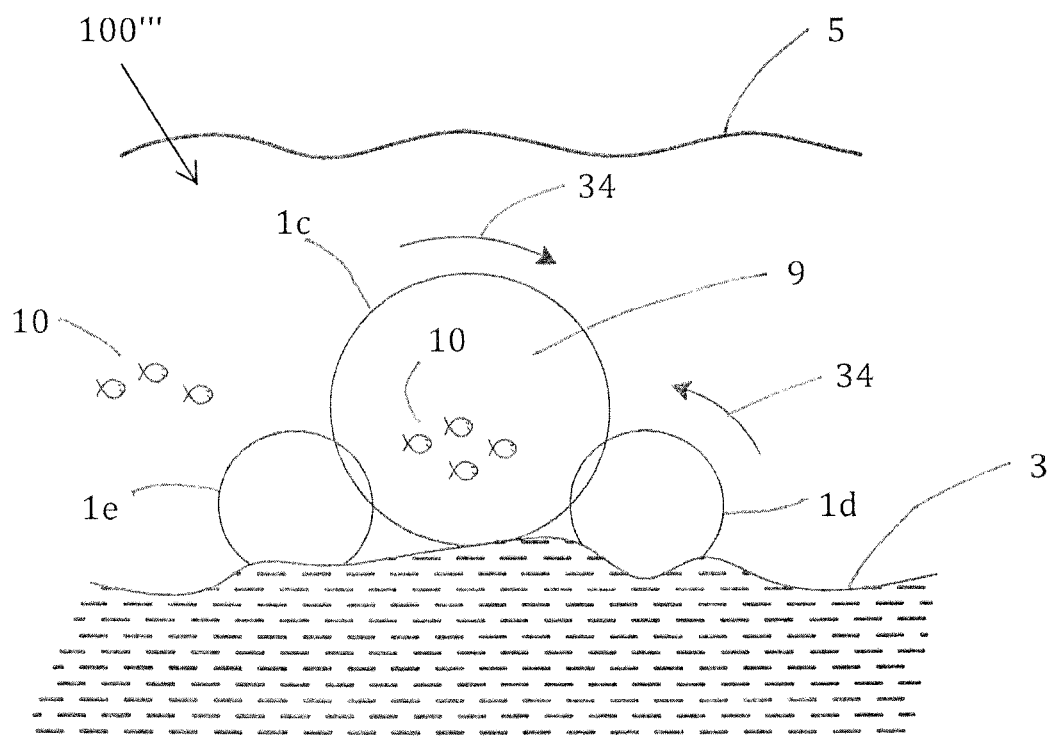
FIG. 4 shows a cross sectional view of a preferred implementation of the present removable artificial reef and barrier system where multiple coils are joined together to form an artificial reef and barricade structure for marine and ecological enhancement, marine life and ecosystem restoration, marine aquaculture, and carbon sequestration.

FIG. 4 shows a cross sectional view of a preferred implementation of the removable artificial reef and barrier system 100''', where multiple wave and current energy dissipater and barrier systems 1c, 1d, 1e (structured as described above with reference to FIG. 1) are joined together to form an artificial reef and barricade structure for wave and current energy dissipation, with primary emphasis on marine and ecological enhancement, marine life and ecosystem restoration, and carbon sequestration. FIG. 4 shows a larger wave and current energy dissipater and barrier system 1c attached to two smaller wave and current energy dissipater and barrier systems 1d, 1e that serve as structural supports to hold the larger wave and current energy dissipater and barrier system 1c in the upright positions more securely in surge conditions. In FIG. 4 the assembly of wave and current energy dissipater and barrier systems 1c, 1d, 1e, form a larger artificial reef structure that rests on the seafloor 3 at a desired depth below the water surface 5.

The design of an assembly of variously sized wave and current energy dissipater and barrier systems 1c, 1d, 1e as shown in FIG. 4, would include considerations of the flow and ebb of the water, including surges, waves, and currents, to produce forces and counter-forces 34 acting upon each dissipater barrier leg 2 of the wave and current energy dissipater and barrier system 1c, 1d, 1e, with the goal of maximizing wave and current energy dissipation and reducing the requirements for anchors and supports for the entire structure.

Also shown in FIG. 4 is the illustration of marine life 10 that would be attracted to live and grow in the vicinity of the protection zone created by the dissipater and barrier systems 1c, 1d, 1e, especially the central treated zone 9. Further ecosystem enhancement, and carbon sequestration, would be achieved by the marine growth such as plants and invertebrates, such as coral, attaching and growing on the dissipater and barrier structure itself, on an otherwise barren seascape.

Figure 5:
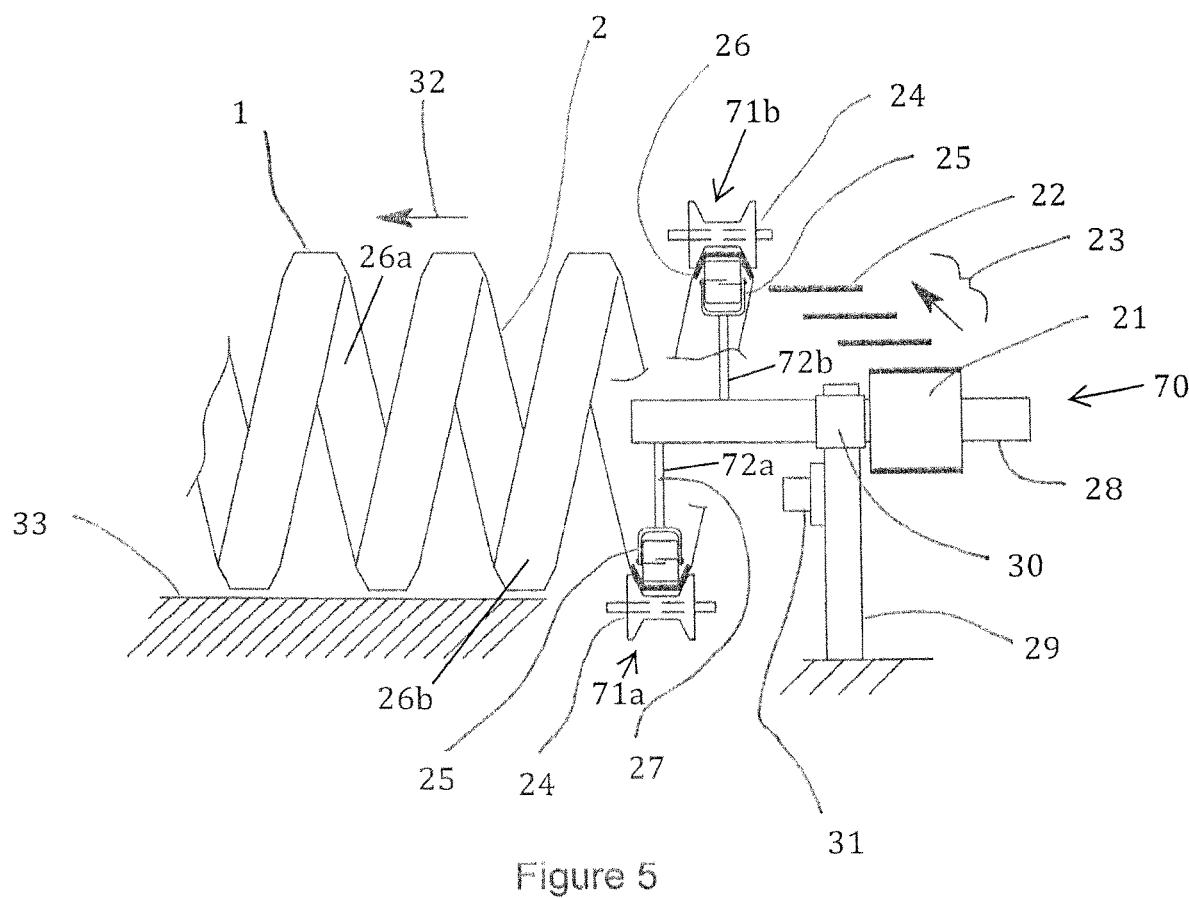
FIG. 5 is a side view illustrating an embodiment of the method of manufacture of the present removable artificial reef and barrier system.

FIG. 5 illustrates one embodiment of the fabrication aspect of a wave and current energy dissipater and barrier system 1 in accordance with the present invention. In accordance with this embodiment, the wave and current energy dissipater and barrier system is constructed from metallic strip of material. In accordance with one embodiment, the wave and current energy dissipater and barrier system is made from titanium. In particular, a material supplied in a rolled coil 21 of metallic strip material 22 is fed by an unrolling motion 23 into an upper roller 24 and lower roller 25 which shapes the metallic strip material 22 into the desired roll form shape 26. That is, the metallic strip material 22 has a roll form shape when viewed along a cross section taken perpendicular to the longitudinal axis of the metallic strip material 22. For example, if a hydrofoil shape is being rolled onto the metallic strip, the roll form shape 26 is considered to have a generally concave internal surface 26a when view from the central axis of the wave and current energy dissipater and barrier system 1 and a generally convex external surface 26b when viewed outside of the radius defined by the dissipater barrier legs 2

As briefly discussed above, the rolling machine 70 used in the fabrication of the wave and current energy dissipater and barrier system 1 in accordance with the present invention includes the upper roller 24 and the lower roller 25 which shape the metallic strip material 22 into the desired roll form shape 26. The upper roller 24 and the lower roller 25 are opposed members between which the metallic strip material 22 moves, relative to the upper and lower rollers 24, 25, as it is formed in accordance with the present invention. The upper roller and lower roller 24, 25 form a roll forming assembly 71a, 71b that is mounted on the end of a rotating roller support 27 of the rolling machine 70. In fact, and in accordance with a preferred embodiment of the present invention, the roller machine 70 includes a first roll forming assembly 71a and a second roll forming assembly 71b mounted to extend from the roller support 27. Mounting rods 72a, 72b extending from the rotating roller support 27 support the first roll forming assembly 71a and the second roll forming assembly 71b, respectively, relative to the rotating roller support 27 such that the first roll forming assembly 71a and a second roll forming assembly 71b rotating with the rotating roller support 27 as it is rotated in accordance with the present invention. The first roll forming assembly 71a and the second roll forming assembly 71b are mounted upon the roller support 27 so as to extend in opposite directions and such that they are linearly offset along the longitudinal length of the roller support 27 in a manner allowing the first forming assembly 71a and the second forming assembly 71b to simultaneous act upon different sections of the metallic strip material 22 while the coil of the wave and current energy dissipater and barrier system 1 is being formed. While a first roll forming assembly 71a and a second roll forming assembly 71b are disclosed in conjunction with the embodiment present in FIG. 5, it is appreciated various numbers of forming assemblies may be used in conjunction with the present invention.

As discussed above, the first roll forming assembly 71a and the second roll forming assembly 71b are used to create a hydrofoil or other preferred shape onto the metallic strip. With this in mind, and in order to create the roll form shape 26 with a generally concave internal surface 26a when view from the central axis of the wave and current energy dissipater and barrier system 1 and a generally convex external surface 26b when viewed outside of the radius defined by the dissipater barrier legs 2, upper roller 24 is formed with a generally external concave profile and the lower roller 25 is formed with a generally external convex profile. The profiles of the upper roller and the lower roller are shaped so as to mate in a manner allowing for the desired roll form shape as described above.

The roller support 27 is mounted on a rotating shaft 28, on which numerous roll forming assemblies 71a, 71b are mounted to produce the desired roll form shape 26 into the dissipater barrier legs 2 of the wave and current energy dissipater and barrier system 1. The rotating shaft 28 is mounted to a pedestal mount 29 by means of a roller bearing 30 which allows the turning of the rotating shaft 28. Rotation of the rotating shaft 28 is provided by a drive motor 31 acting upon the rotating shaft 28. The effect of the rotation of the rollers 24, 25 mounted to the rotating shaft 28 is to produce the desired roll form shape 26 and simultaneously eject the newly formed wave and current energy dissipater and barrier system 1 in the lateral direction 32 along a defined path platform 33, where the formed wave and current energy dissipater and barrier system 1 does not rotate as it is ejected.

Figure 13:
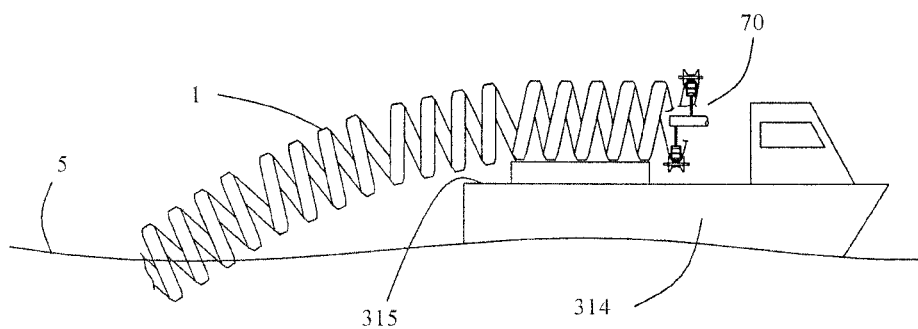
FIG. 13 shows a side view of the artificial reef and barrier system integrated with a marine deployment vessel.
Figure 14:
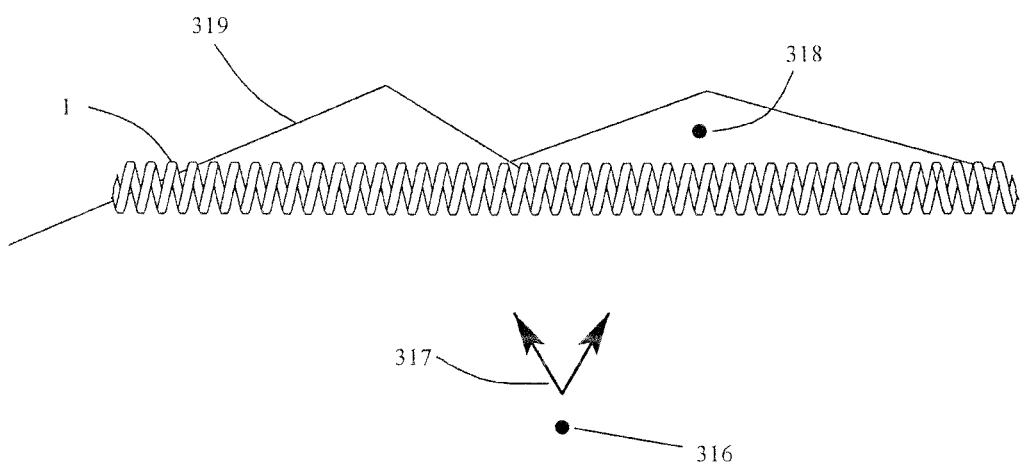
FIG. 14 shows a side view of the artificial reef and barrier system being installed across a land area.

The present manufacturing technique may be implemented on board a water vessel such that the wave and current energy dissipater and barrier system may be immediately distributed within the marine environment as they are produced, such as further described in FIG. 13, or, on a land-based vehicle to distribute across a land or land-water transition, as further described in FIG. 14.

In addition to the process described above, it is contemplated that the wave and current energy dissipater and barrier system may be manufactured for application as a physical barricade, for land-based or water-based applications. It is anticipated that the use of robotic manufacturing and joining methods, such as that described in FIG. 12, will enable the rapid deployment of the artificial reef and barrier system for environmental and physical defense applications. These applications include but are not limited to atmospheric and wind erosion damage mitigation, tidal and splash zone erosion, and land, ocean, water, and land-water transition physical barricades.

In addition to the manufacturing process described above, it is contemplated the wave and current energy dissipater and barrier system may be manufactured via various other techniques. For example, the wave and current energy dissipater and barrier system may be manufactured or assembled using additive manufacturing techniques. Another example would include the use of bio-compatible non-metallics, including extruded or laid-up resin and fiber materials for manufacture.

Figure 8:
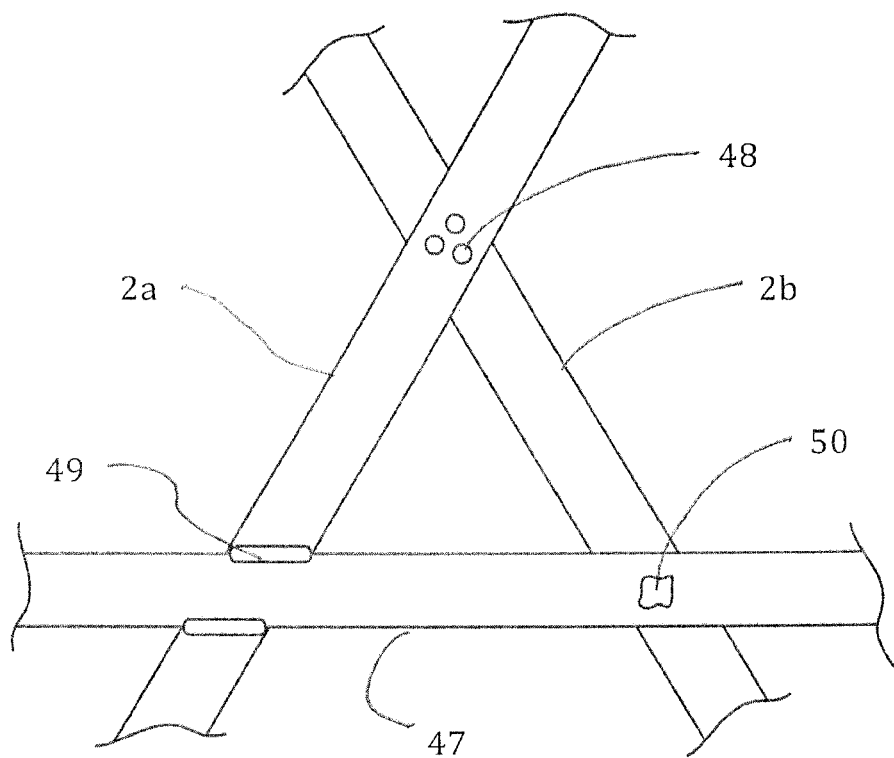
FIG. 8 is a top plan view demonstrating a joining method used to construct the wave energy dissipater and barrier system into a semi-ridged structural assembly.

Referring to FIG. 8, it is contemplated that structural reinforcements 47, 48, 49 may be helpful in maintaining the structure of the wave and current energy dissipater and barrier systems 1. Although not shown in FIG. 5, such vertical or horizontal structural reinforcements 47, 48, 49 (as shown in FIG. 8 and as discussed below) would be coupled to the wave and current energy dissipater and barrier systems 1 using known structural engineering techniques to provide the desired structural integrity that may be required for various load conditions. The vertical to horizontal structural reinforcement can be attached to the formed wave and current energy dissipater and barrier system 1 by means of various fastening methods, such as bolts, screws, rivets, welding, cable, clips, or additive manufacturing.

In particular, FIG. 8 shows a view of various joining methods used to construct the wave and current energy dissipater and barrier system 1 into a semi-ridging structural assembly. For example, and considering the embodiment disclosed with reference to FIG. 3, the dissipater barrier legs 2a & 2b can be joined together using a variety of methods, including rivets, welds, spot welding, adhesives, threaded fasteners, wire loops, piercing rivets, or any known and established method of joining two materials together. FIG. 8 shows rivets 48 being used to join dissipater barrier legs 2a & 2b where they cross. FIG. 8 also shows welds 49 being used to join the dissipater barrier leg 2a to a laterally structural stringer 47; in this case the weld metal is laid by an additive manufacturing type of metal deposition process. FIG. 8 shows a plug-weld 50 being used to join the dissipater barrier leg 2b to a laterally structural stringer 47; in this case the weld metal is laid by type of cold-gas dynamic spraying. It is appreciated that a variety of joining techniques may be used to ensure the structural stability of the wave and current energy dissipater and barrier systems 1 of the present invention.

The fabrication aspect of the invention illustrated in FIG. 5 is intended to accommodate a variety of raw material inputs, including metallic, non-metallic, and recycled materials, and would be accompanied by simultaneous operations such as the installation of ancillary reinforcement processes and components, including forming, welding, fastening, overlays, cladding, plating, and surface treatments.

The shape and/or construction of the roll form shape 26, that is, the cross sectional shape and/or construction of the material from which the wave and current energy dissipater is made, shown in FIG. 5, that makes up the dissipater barrier leg 2 can be of a variety of configurations including perforated, corrugated, mesh, pre or post stamped, foiled, specifically shaped perforations to enhance energy dissipation, hollow cored, boxed, tubed, tapered, asymmetrical, and, said shapes and forms could be continuously or intermittently oriented in any direction relative to flow of wave or current flow.

Figure 6:
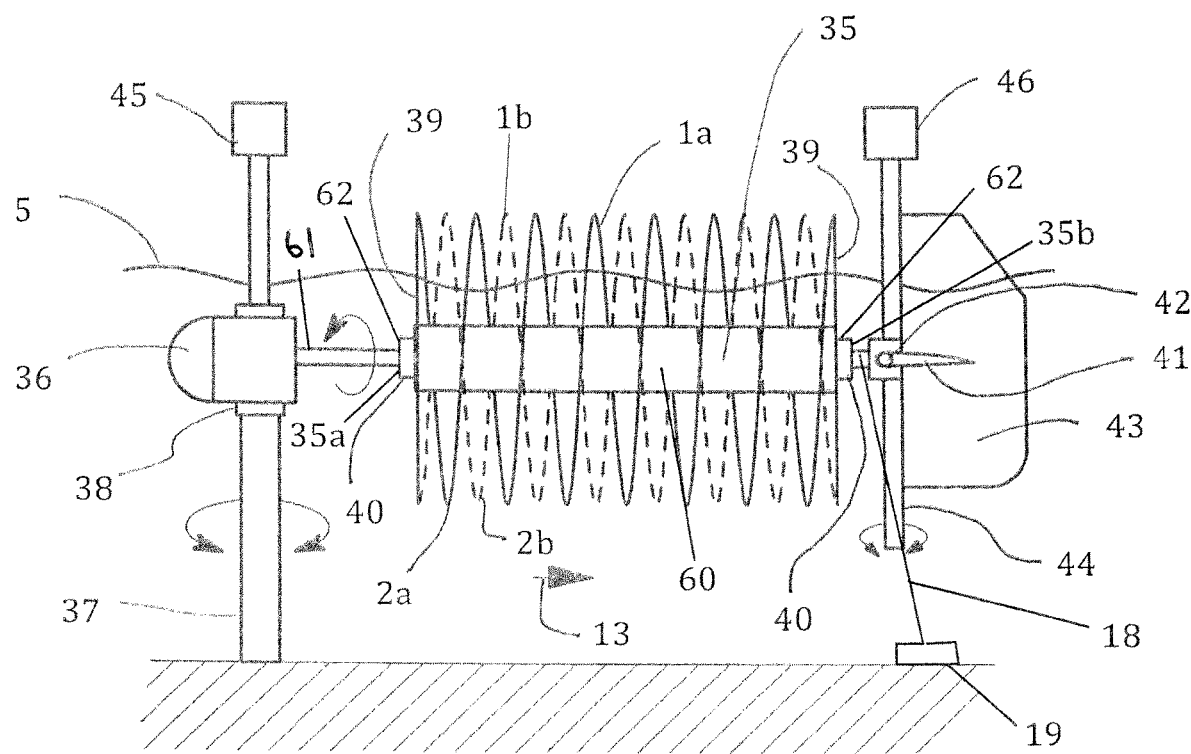
FIG. 6 shows a cross sectional view of a preferred implementation of the present removable artificial reef and barrier system integrating a power generator for harnessing power from wave, tidal, or water current kinetic energy.

FIG. 6 shows a cross sectional view of a preferred embodiment of the invention used for harnessing power from wave, tidal, or water current kinetic energy, where the wave and current energy dissipater and barrier systems 1a, 1b are floated near or partially above the water surface 5 with a buoyancy controlled center structure 35 extending through the center of the wave and current energy dissipater and barrier system 1 and secured thereto. As will be appreciated this embodiment employs two wave and current energy dissipater and barrier systems 1a, 1b comprising a wave and current energy dissipater and barrier assembly in a manner similar to the embodiment shown in FIG. 3, although it is appreciated a single wave and current energy dissipater or a plurality of wave and current energy dissipater and barrier systems could be employed. In this embodiment, the wave and current energy dissipater and barrier systems 1a, 1b are connected to a power generator 36, for example, an electrical generator, air compressor, or pump. The wave and current energy dissipater and barrier systems 1a, 1b is connected to the power generator 36 via a coupling arm 61 extending from first end 35a of the buoyancy controlled center structure 35 such that the wave and current energy dissipater and barrier system 1 and the buoyancy controlled center structure 35 are able to rotate relative to the power generator 36 in a manner imparting rotary motion to the power generator 36 to harness energy from the kinetic energy of the water stream.

The power generator 36 is mounted on a power generator mounting structure 37 that is anchored to the seafloor 3. The power generator 36 is connected to the generator mounting structure in a manner allowing the power generator 36, and ultimately, the wave and current energy dissipater and barrier systems 1a, 1b and the buoyancy controlled center structure 35 which are connected to the power generator, to pivot, or rotate, relative to the seafloor 3. In accordance with a preferred embodiment, a pivot bearing 38 pivotally connects the power generator 36 to the generator mounting structure 37. In accordance with the disclosed embodiment, the axis about which the power generator 36 pivots relative to the generator mounting structure 37 is perpendicular to the axis about which the wave and current energy dissipater and barrier systems 1a, 1b rotate when imparting rotary energy to the power generator 36. By pivotally connecting the power generator 36 to the generator mounting structure 37, the wave and current energy dissipater and barrier systems 1a, 1b may be aligned to the optimum angle to harness power, by the transference of rotational energy of the wave and current energy dissipater and barrier systems 1a, 1b to the power generator 36, from the water flowing current 13 and forces and counter-forces 34 (described in FIG. 4) associated with wave and current energy dissipation.

The preferred construction of the buoyancy controlled center structure 35 shown in FIG. 6 is a hollow tube 60 with caps 62 on each end to create a water tight buoyancy controlled center structure 35. The buoyancy, using liquid or solid material ballasts, of the buoyancy controlled center structure 35 is tailored to the desired level to maintain the entire wave and current energy dissipater and barrier systems 1a, 1b and buoyancy controlled center structure 35 at the desired level at our below the water surface 5. As such, the wave and current energy dissipater and barrier systems 1a, 1b and the buoyancy controlled center structure 35 are capable of movement toward and away from the seafloor 3. In order to allow for this movement, and considering the fact the wave and current energy dissipater and barrier systems 1a, 1b and the buoyancy controlled center structure 35 are connected to the power generator 36, the power generator is also structured to allow for movement toward and away from the seafloor 3. Such movement is achieved by providing the pivot bearing 38, which connects the power generator 36 to the generator mounting structure 37, with a bearing surface (not shown) that allows up and down movement of the pivot bearing 38 (and ultimately the power generator 36) relative to the generator mounting structure 37.

As illustrated in FIG. 6, the buoyancy controlled center structure 35, is maintaining a portion of the dissipater barrier legs 2 (or 2a & 2b depending upon the embodiment to which it is applied) out of the water to reduce drag in concert with the flow direction hydrodynamic forces acting on the submerged dissipater barrier legs 2 (or 2a & 2b depending upon the embodiment to which it is applied) which cause the desired rotation. The buoyancy controlled center structure 35 could also be used to produce rotational torque on a fluid flow, similar to a stator on a turbine device, with the use of fins, troughs, or channels, and can be fixed, stationary, or rotating relative to the dissipater barrier legs 2.

In FIG. 6, the dissipater barrier legs 2a, 2b are interconnected using conventional coupling techniques known to those skilled in the art (some of which are shown in FIG. 8) to form a semi-ridged structure with structural bonding members 39 connecting the assembly of dissipater barrier legs 2a, 2b to the buoyancy controlled center structure 35. To accommodate loading conditions, any number of bonding members 39 could be installed along the length of the buoyancy controlled center structure 35. The cross section, orientation, and configuration of the dissipater barrier legs 2a, 2b are formed to optimize the desired effects of lift, tangential force, and wave and current dissipation as required for the specific application.

In FIG. 6, at each of the first and second ends 35a, 35b of the buoyancy controlled center structure 35 is a universal connector 40, which allows for the joining together of multiple buoyancy controlled center structures 35 to create whatever length or combination of wave and current energy dissipater and barrier systems 1a, 1b and buoyancy controlled center structure 35 assemblies is desired. The universal connector 40 could be in the form of a ridged coupling or a hinged type of universal joint to prevent the transmission of bending moments along the long axis of multiple buoyancy controlled center structures 35.

The end of the buoyancy controlled center structure 35 opposite of the power generator 36 (which is in accordance with the disclosed embodiment is the second end 35b of the buoyancy controlled center structure 35), can be fixed at a desired angle relative to the laterally flowing current 13 using a tether 18 and anchor system 19 (see FIG. 3, also). FIG. 6 shows a preferred embodiment of the invention where the second end 35b of the buoyancy controlled center structure 35, which is opposite of the power generator 36, is connected to a horizontal stabilizer 41 and a vertical stabilizer 43. The horizontal stabilizer 41 rotates about a horizontal stabilizer axis pivot 42, and the vertical stabilizer 43 rotates about a vertical stabilizer axis pivot 44.

The purpose of the horizontal stabilizer 41 and vertical stabilizer 43, shown in FIG. 6, is to stabilize and steer the wave and current energy dissipater and barrier systems 1a, 1b and buoyancy controlled center structure 35 assemblies into the proper angle and pitch relative to the laterally flowing current 13, for optimum power generation. A top view of the horizontal stabilizer 41 and vertical stabilizer 43 is shown as FIG. 7. Again, the desired angle relative to the laterally flowing current 13 could be achieved using the tether 18 and anchor system 19 (see FIG. 3).

Where the wave and current energy dissipater and barrier systems 1a, 1b are used in conjunction with an power generator 36, the construction of the wave and current energy dissipater and barrier systems 1a, 1b with a hydrofoil profile as described above is especially important. The hydrofoil profile assists the wave and current energy dissipater and barrier systems 1a, 1b in moving as it adjusts its position to optimize power generation as described above.

Control and monitoring equipment for the operation of the invention shown in FIG. 6 is housed in equipment boxes 45, 46 installed above the power generator 36 and the vertical stabilizer axis pivot 44, respectively. This control and monitoring could include performance data, angle optimization data, velocity and power data, temperature, pressure, remote control and load data.

Figure 7:
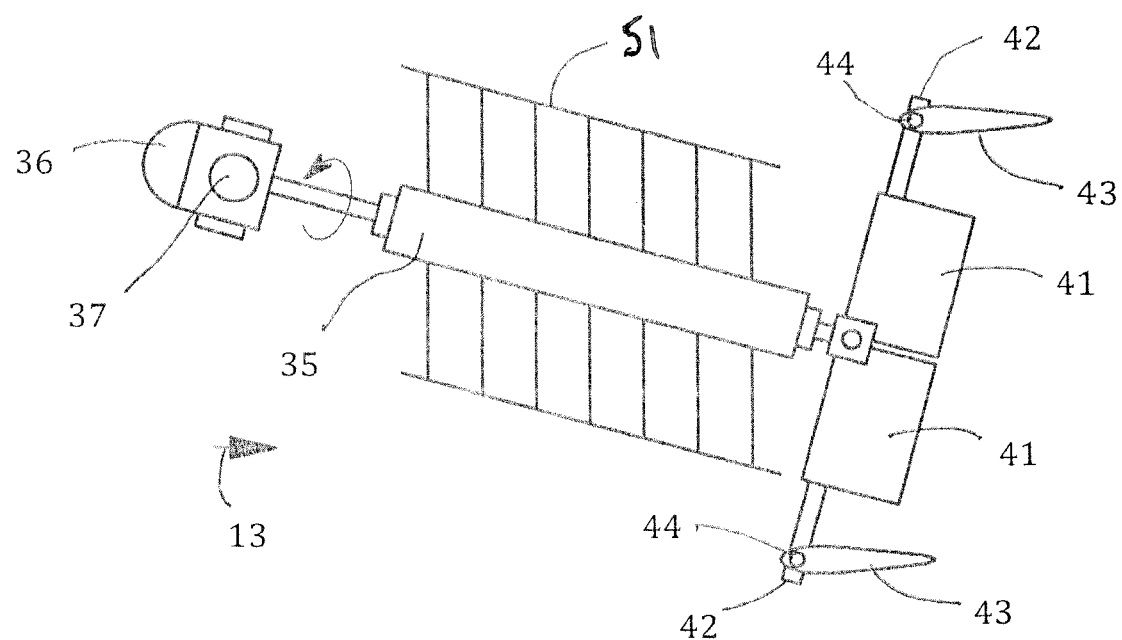
FIG. 7 shows a top view of the removable artificial reef and barrier system with a power generator as similar shown in FIG. 6.

FIG. 7 shows a top view of the invention shown in FIG. 6, minus the equipment boxes, and with the substitution of a turbine-style power wheel 51, instead of the wave and current energy dissipater and barrier systems 1a, 1b (shown in FIG. 6), to harness energy from kinetic energy of the moving water.

The turbine-style power wheel 51 in FIG. 7 is shown attached to the buoyancy controlled center structure 35 and the horizontal stabilizer 41 and vertical stabilizer 43. The design of the turbine-style power wheel 51 can be a helical Darrius type (that is, of vertical axis wind turbine consisting of a number of curved aerofoil blades mounted on a vertical rotating shaft or framework, see U.S. Pat. No. 1,835,018), a helical Savonius type (that is, a type of vertical-axis wind turbine consisting of a number of aerofoils), a Gorlov type (that is, a turbine having helical blades/foils), or one of many different designs that have been used for turbine-style power generation.

The top view shown in FIG. 7 illustrates a preferred orientation of horizontal stabilizers 41 and vertical stabilizers 43, also shown in FIG. 6, to steer the turbine-style water wheel 51 and buoyancy controlled center structure 35 into the proper angle and pitch relative to the laterally flowing current 13, for optimum power generation. A side view of the horizontal stabilizer 41 and vertical stabilizer 43 is shown in FIG. 6.

FIG. 8 shows the is a top plan view demonstrating a joining method used to construct the wave energy dissipater and barrier system into a semi-ridged structural assembly, as described in the discussion regarding fabrication provided for FIGS. 5 and 6.

Figure 9:
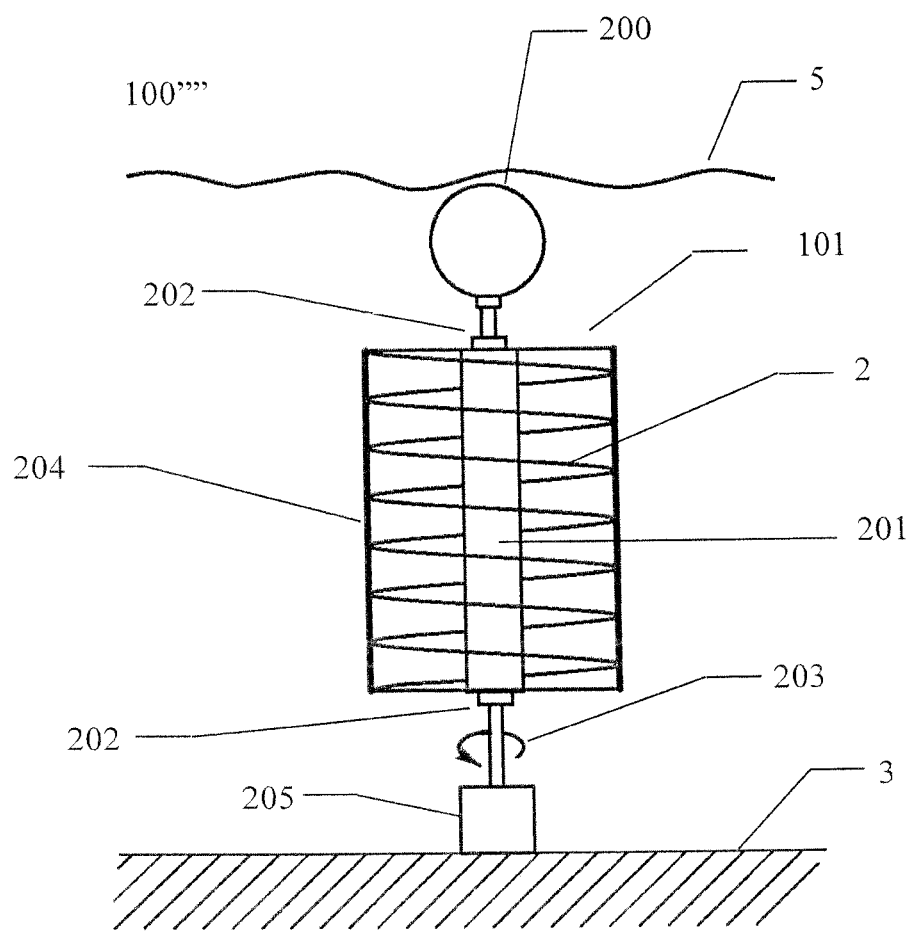
FIG. 9 shows a top view of the removable artificial reef and barrier system in a vertical orientation.

FIG. 9 shows a preferred embodiment of the removable artificial reef and barrier system 100'''', where a wave and current energy dissipater and barrier assembly 101 is floated near the water surface 5 in a vertical orientation with a buoy assembly 200. The structural aspects of the vertically oriented removable artificial reef and barrier system 100'''' include a core structure 201 centered in the axial length of the shape created by the dissipater barrier legs 2, and bearing assemblies 202 in the event there are desirable purposes to enable rotation 203 about the axis of the core structure 201. Purposes to enable rotation include energy production or energy dissipation (powering, pumping, or dynamic constructive or destructive interference). FIG. 9 shows axially run dissipater leg attachments 204 to provide structure reinforcement, additional habitat for biological growth, and desirable hydrodynamic properties.

Figure 10:
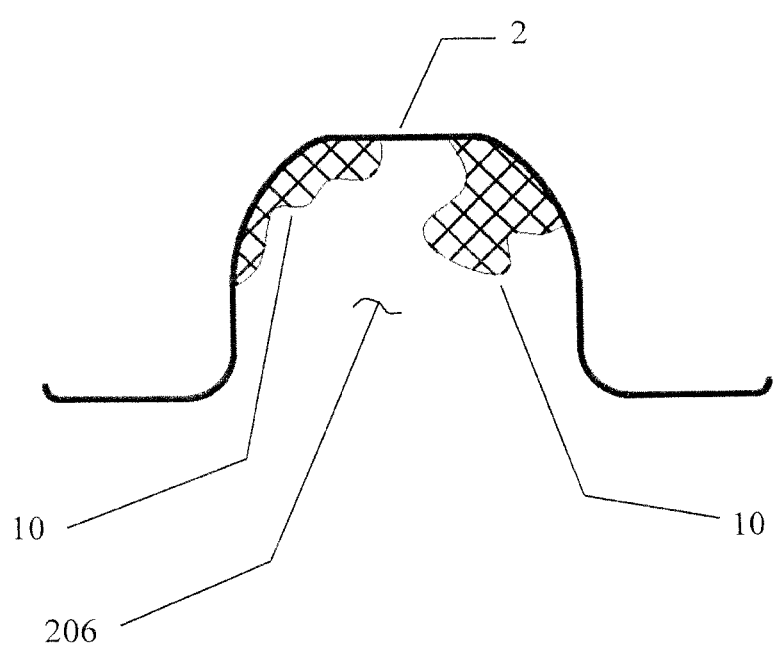
FIG. 10 shows a view of a preferred implementation of a dissipater leg with a cross-section providing a semi-shielded annulus for biological growth.

FIG. 10 shows a cross section of the dissipater barrier leg 2 configured to produce a semi-shielded annulus zone 206. Prior discussions of the cross sectional shape of the dissipater barrier legs 2 was provided in the description of FIG. 5, including hollow cored, boxed, tubed, tapered, and asymmetrical. This includes shapes where an annulus zone 206 provides a sheltered habitat for the formation of marine life 10 and enhances the attractiveness for biological organisms to live and grow in the artificial reef environment created by the wave and current energy dissipater and barrier system 1 structure. The shape of the annulus zone 206 can range from square openings to circular and nearly enclosed annulus shapes that are compatible with the different objectives, include general marine growth to specific marine aquaculture.

Figure 11:
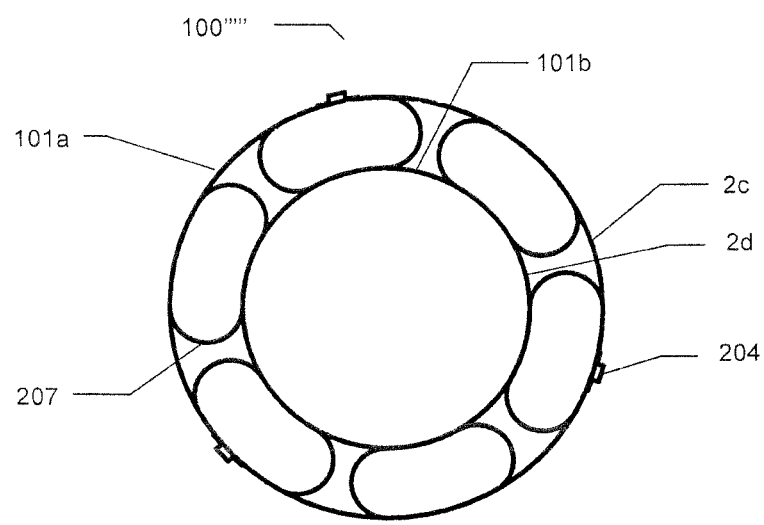
FIG. 11 shows an end view of a preferred implementation of the removable artificial reef and barrier system with a smaller diameter second unit joined with joint braces forming a semi-rigid structure.

FIG. 11 shows an end view of a preferred embodiment of the removable artificial reef and barrier system 100'''', where a wave and current energy dissipater and barrier assembly is configured with two different wave and current energy dissipater and barrier systems 101a and 101b, of a different diameter, that are joined together by a concentric pattern of joint braces 207, forming a semi-rigid structure. Further structural reinforcement is achieved with the addition of axially run dissipater leg attachments 204. The number, size, and location of concentric wave and current energy dissipater and barrier systems 101a and 101b, joint braces 207, and axially run dissipater leg attachments 204 would be dependent on the size and structural requirements of each particular removable artificial reef and barrier system 100''''.

Although not shown in FIG. 5, vertical or horizontal structural reinforcements (such as 204 and 207 shown in FIGS. 9 and 11) would be coupled to the wave and current energy dissipater and barrier systems 1 using known structural engineering techniques to provide the desired structural integrity that may be required for various load conditions. The vertical to horizontal structural reinforcement can be attached to the formed wave and current energy dissipater and barrier system 1 by means of various fastening methods, such as bolts, screws, rivets, welding, cable, clips, or additive manufacturing.

Figure 12:
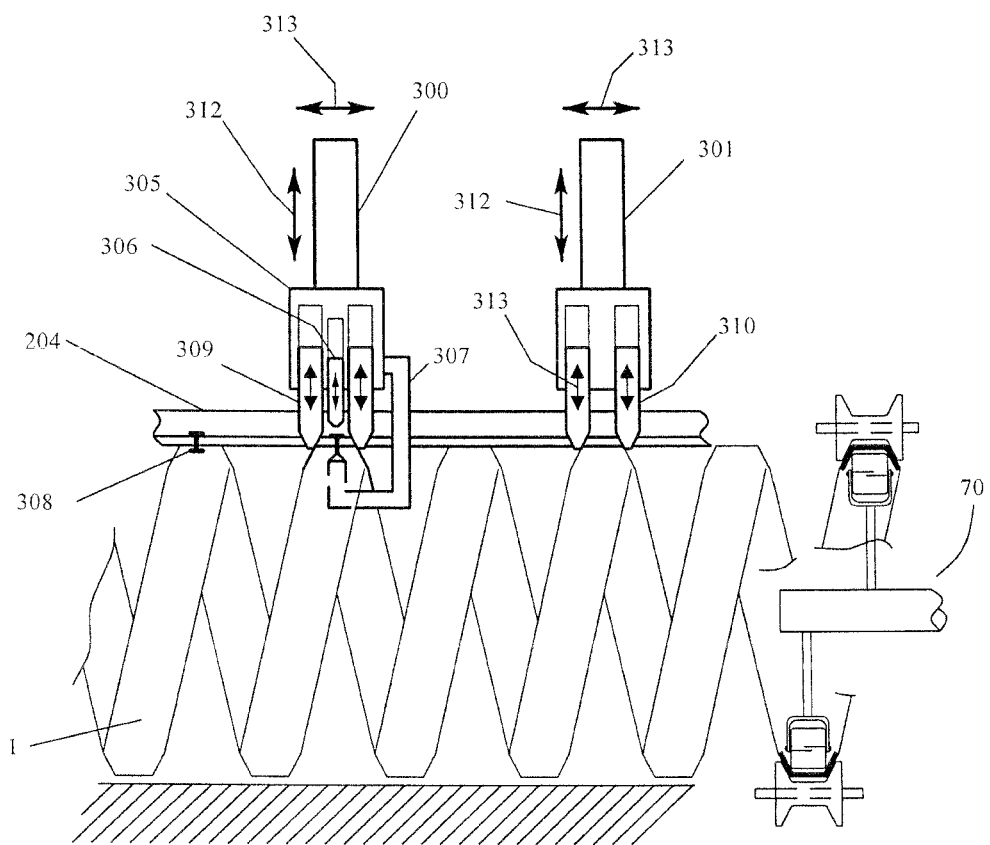
FIG. 12 shows a side view of a method of manufacture of the present artificial reef and barrier system using automation and robotic techniques for assembly and joining.

FIG. 12 shows a side view of another method of manufacture of the present artificial reef and barrier system using automation and robotic techniques for assembly and joining. The illustration provided as FIG. 12 shows a preferred embodiment of the robotic joining of the axially run leg attachments 204 (also shown in FIGS. 9 and 11). In this drawing, the artificial reef and barrier system 1 is shown exiting the rolling machine 70 (as shown in FIG. 5). Immediately following the rolling process a robotic welding assembly 300 and a robotic positioner assembly 301 are positioned to automatically join the axially run leg attachments 204 to each of the dissipater barrier legs 2. In the embodiment shown in FIG. 12, the method of joining the dissipater barrier leg 2 to the axially run leg attachment 204 is by an electrical spot-welding machine 305 with both a top electrode 306 and a bottom electrode 307. The resulting spot-weld 308 shown in FIG. 12 is drawn to look like a form of rivet for illustration purposes only, where, in actuality there is no insert required, in accordance with standard spot-welding practice the two sheet metal components are directly bonded together. The robotic joining method could employ the use of rivets, bolts, wire insert, screws, or other welding or additive manufacturing methods.

The illustration provided as FIG. 12 shows the spot-welding machine 305 incorporated with power actuated positioning fingers 309. With independent in and out motion 311, the positioning fingers 309 line up the axially run leg attachment 204 with the dissipater barrier leg 2 for the joining process. In addition, the positioning fingers 309 of the robotic welding assembly 300 work in conjunction with the positioning fingers 310 installed on the robotic positioner assembly 301 to automatically adjust the space between each adjacent dissipater barrier leg 2. It should be noted that in FIG. 12, for illustration purposes, the robotic welding assembly 300 and the robotic positioner assembly 301 are not shown to be contacting the adjacent dissipater barrier legs 2, but, the purpose should be evident that the robotic welding assembly 300 and the robotic positioner assembly 301 work in coordination to achieve the specified spacing between the dissipater barrier legs 2.

As shown in FIG. 12, both the robotic welding assembly 300 and the robotic positioner assembly 301 are mounted on structural suitable positioning equipment (not shown) to provide vertical movement 212 and horizontal movement 213 by either linear or multi-axis motion control. Overall, the coordinated robotic motion between the robotic welding assembly 300 and the robotic positioner assembly 301, the positioning fingers 309 and 311, and the spot-welding machine 305, result in a continuous positioning and joining process that continually produces a structurally sound artificial reef and barrier system. It is contemplated that multiple robotic welding assembly 300 and the robotic positioner assembly 301 systems could be applied to one artificial reef and barrier system assembly line.

FIG. 13 shows a side view of the artificial reef and barrier system 1 integrated with a marine deployment vessel 314. In this illustration the marine deployment vessel 314 is shown with a work deck 315 where a rolling machine 70 is installed and configured to eject the artificial reef and barrier system 1 out the back toward and into the water surface 5. Not shown in FIG. 13 are all the methodologies, placements, and ancillary features of the artificial reef and barrier system 1 described for this invention, including those described in the specifications and drawings of this invention.

FIG. 14 shows a side view of the artificial reef and barrier system 1 installed across a land area 319. In this illustration the artificial reef and barrier system 1 is installed to prevent or inhibit access from a point in the foreground 316 to a point in the background 318 of the land area 319 in the direction shown by arrow 317. Not shown in FIG. 14 are all the methodologies, placements, and ancillary features of the artificial reef and barrier system 1 described for this invention, including those described in the specifications and drawings of this invention.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the description and claims appropriately interpreted by those skilled in the art.

The invention claimed is:

1. A removable artificial reef and barrier system, comprising:
a wave and current energy dissipater and barrier system in the form of a continuous coil, the wave and current energy dissipater and barrier system including a plurality of spaced dissipater barrier legs that are spaced at a distance to achieve wave and current energy dissipation, wherein the wave and current energy dissipater and barrier system is composed of strands of material spaced about a central axis so as to define the plurality of dissipater barrier legs, the dissipater barrier legs are spaced approximately 10 centimeters to 3 meters from each other and the dissipater barrier legs have a diameter from approximately 26 centimeters to 8 meters;

wherein the material is a metallic strip material having a concave internal surface and convex external surface.

2. The removable artificial reef and barrier system according to claim 1, wherein the wave and current energy dissipater and barrier system has a hydrofoil profile.

3. The removable artificial reef and barrier system according to claim 1, further including a plurality of wave and current energy dissipater and barrier systems.

4. A removable artificial reef and barrier system, comprising:

a wave and current energy dissipater and barrier system in the form of a continuous coil, the wave and current energy dissipater and barrier system including a plurality of spaced dissipater barrier legs that are spaced at a distance to achieve wave and current energy dissipation, wherein the wave and current energy dissipater and barrier system is composed of strands of material spaced about a central axis so as to define the plurality of dissipater barrier legs, the dissipater barrier legs being spaced approximately 10 centimeters to 3 meters from each other and the dissipater barrier legs having a diameter from approximately 26 centimeters to 8 meters;

wherein the material is a metallic strip material having a concave internal surface and convex external surface and wherein the wave and current energy dissipater and barrier system is supported by a pontoon assembly.

5. The removable artificial reef and barrier system according to claim 4, wherein the wave and current energy dissipater and barrier system has a hydrofoil profile.

6. The removable artificial reef and barrier system according to claim 4, further including a plurality of wave and current energy dissipater and barrier systems.

7. A removable artificial reef and barrier system, comprising:

a wave and current energy dissipater and barrier system in the form of a continuous coil, the wave and current energy dissipater and barrier system including a plurality of spaced dissipater barrier legs that are spaced at a distance to achieve wave and current energy dissipation, wherein the wave and current energy dissipater and barrier system is composed of strands of material spaced about a central axis so as to define the plurality of dissipater barrier legs, the dissipater barrier legs being spaced approximately 10 centimeters to 3 meters from each other and the dissipater barrier legs having a diameter from approximately 26 centimeters to 8 meters;

wherein the material is a metallic strip material having a concave internal surface and convex external surface and further including a power generator connected to the wave and current energy dissipater and barrier system.

8. The removable artificial reef and barrier system according to claim 7, wherein the power generator is connected to a pivot bearing allowing the power generator to pivot or rotate relative to a seafloor in order to align the wave and current energy dissipater and barrier system to an optimum angle to harness power.

9. The removable artificial reef and barrier system according to claim 7, wherein the wave and current energy dissipater and barrier system has a hydrofoil profile.

10. The removable artificial reef and barrier system according to claim 7, further including a plurality of wave and current energy dissipater and barrier systems.

* * * * *